Patented Nov. 1, 1949

2,486,934

UNITED STATES PATENT OFFICE 2,486,934

PROCESS FOR THE PRODUCTION OF NITRILES

Michael Erchak, Jr., Morris Plains, N. J., assignor to Allied Chemical & Dye Corporation, New York, N. Y., a corporation of New York No Drawing. Application February 20, 1947, Serial No. 729,887

7 Claims. (Cl. 260—465)

This invention relates to a process for the production of aromatic nitriles by oxidizing in the presence of ammonia an alkyl substituted cyclohexane or an alkyl substituted cyclopentane containing in one or more of the alkyl substituents at least two carbon atoms, or an alcohol, an aldehyde or a ketone which is an intermediate oxidation product of such substituted cyclohexane or cyclopentane.

It is known that by oxidizing certain aromatic compounds in the vapor phase by means of molecular oxygen, those compounds may be converted to partial oxidation products such as acids or acid anhydrides. Thus, it is well known that benzene vapors may be oxidized with air or other oxygen gas to form maleic anhydride or maleic acid. Napthalene may be oxidized to phthalic anhydride. These oxidation reactions, carried out by passing the mixture of aromatic compound and molecular oxygen in contact with an oxidation catalyst at suitable conditions of temperature, reaction time, etc., give good yields of the desired intermediate oxidation product.

The vapor phase oxidation process, however, has found but limited application for the treatment of substituted benzene compounds. In general, they have not been found to be oxidizable by molecular oxygen in the vapor phase to form a desired product in good yield. Their oxidation cannot be controlled, as can the oxidation of benzene or naphthalene to proceed to a given stage of partial oxidation, such as the formation of an acid or acid anhydride. The substituted benzene compounds show a strong tendency for the oxidation to form a mixture of various partial products and to go all the way to the formation of oxides of carbon and water. There is also the formation of condensation products. With one or two possible exceptions, therefore, such as the oxidation of toluene to benzaldehyde and benzolic acid, there has been little indication that the vapor phase oxidation of alkyl substituted benzenes can be of practical use in the preparation of intermediate oxidation products of the substituted benzene compounds.

I have now discovered, however, that in oxidizing certain alkyl substituted naphthenes, i. e. the alkyl substituted cyclohexanes or the cyclopentanes containing at least two carbon atoms in one or more alkyl side chains, in the vapor phase with molecular oxygen, by having ammonia present in the reaction mixture, nitriles of the benzene series may be formed in good yields. It appears that the ammonia reacts with partial oxidation products of these substituted naphthenes to form aromatic nitriles which are relatively stable under the reaction conditions and hence are not further oxidized down to, for example, oxides of carbon and water. My discoveries provide, therefore, a method whereby desired, useful products may be obtained in good yields in the oxidation of the substituted cyclohexanes and cyclopentanes and may be recovered from the reaction products.

The compounds which may be converted into nitriles by the process of this invention are the alkyl substituted cyclopentanes which contain at least two carbon atoms in the alkyl substituents and the alkyl substituted cyclohexanes. Both the cyclohexane and the cyclopentane compounds may contain more than one alkyl substituent, and in the case of the cyclopentanes in which the only alkyl substituent is methyl, they must contain at least two methyl radicals attached to carbon atoms of the cyclopentane ring. The alkyl radicals may be in a partially oxidized condition, as in the case where one hydrogen of the alkyl radical has been substituted by the hydroxy radical, —OH, or two hydrogens by oxygen, =O. Further, one or more hydrogen atoms attached to the carbon of the cyclohexane or cyclopentane ring may be substituted by a halogen atom, e. g. —F, —Cl, or —Br. Any and all of the alkyl substituted cyclohexanes and cyclopentanes having the structures herein defined may be treated to form nitriles by the process of this invention.

In place of ammonia a primary alkyl amine may be used to form the nitriles. Any nitrogen compound converted into ammonia at the elevated temperatures at which the oxidation of the substituted benzene compound is carried out may be used in place of ammonia.

The reaction mixture should contain at least one molecule of ammonia for every one —CN radical in the nitrile to be produced from the alkyl substituted naphthene. Further, it has been found that about two molecules of ammonia for every —CN radical in the nitrile to be formed from the naphthene represents a ratio below which the yields of nitrile rapidly decrease. The yields of nitrile are improved by additionally including in the reaction mixture about one molecule of ammonia for every carbon atom to be removed from the substituted naphthene in forming the nitrile. Accordingly, I preferably pass into contact with the oxidation catalyst a reaction mixture containing, in addition to two molecules NH₃ for each —CN radical in the nitrile to be formed by the reaction, about one molecule of ammonia for every carbon atom which is to be burned from the molecule of the substituted naphthene in forming the desired nitrile. More than these amounts of ammonia may, of course, be used but as the amount of ammonia is increased above these proportions, the amount of ammonium carbonate and carbamate in the product gases increases. Large quantities of the carbonate and carbamate increase the difficulty in recovering the nitrile from the oxidation products.

The following are representative of the ratios of ammonia to substituted naphthenes which it is preferred to employ in the inlet gases for formation of the nitrile and of the preferred additional amount of ammonia in these gases when carbon is burned from the molecule of the substituted benzene or naphthalene in forming the nitrile:

In oxidizing methyl cyclohexane to benzonitrile—about two or more mols of ammonia for every one mol of methyl cyclohexane.

In oxidizing ethyl cyclohexane to benzonitrile—about two or more mols of ammonia for every one mol of ethyl cyclohexane and preferably about 3 or more mols of ammonia for every one mol of ethyl cyclohexane.

In oxidizing dimethyl cyclopentane or ethyl cyclopentane to form benzonitrile—about two or more mols of ammonia for every one mol of dimethyl cyclopentane or ethyl cyclopentane.

When a primary alkyl amine is employed instead of ammonia, the same molecular proportions are used of amine to substituted benzene compound as described above for ammonia.

Other conditions in carrying out the process of my invention may be those heretofore employed for the vapor phase oxidation of aromatic compounds, e. g. for the oxidation of benzene to maleic anhydride or naphthalene to phthalic anhydride. Thus, in carrying out my invention the substituted naphthene mixed with air or other oxygen gas in proportions such that the mixture is non-explosive, is passed at elevated temperatures in contact with an oxidation catalyst. The reaction mixture may contain an excess of oxygen over that stoichiometrically required for the oxidation of the naphthene to the related acid or even an excess over that required for complete oxidation of the organic compound. Insufficient oxygen for oxidation of the naphthene to the related acid may be used. The rate of passage of the reaction mixture over the catalyst, temperature, and other operating conditions are regulated, as known to those familiar with the art of partially oxidizing aromatic compounds, to give a desired attack of the organic material without undue complete oxidation to oxides of carbon and water. While the several reaction conditions are related to each other so variations in one condition will permit varying another condition without substantially affecting the results of the process, a representative set of conditions is as follows: passing a reaction mixture containing 1.5 to 7 mols $NH_3$ and 50 to 200 mols air for every 1 mol of the substituted naphthene over a catalyst active for oxidizing benzene to maleic anhydride at about 425° C. to about 475° C. and a space velocity of 1000 to 5000 cc. of reaction gas (calculated to S. T. P.) per hour per cubic centimeter apparent volume of catalyst.

The catalysts employed in carrying out my process may be any of the catalysts which promote the oxidation of organic compounds, preferably those catalysts which have been found particularly suitable for oxidizing benzene to maleic anhydride or naphthalene to phthalic anhydride. The preparation and composition of preferred catalysts are disclosed, for example in United States Patents 2,081,272 which issued May 25, 1937 to Harold B. Foster and 2,180,353 which issued November 21, 1939 to the same inventor, and United States Patent 2,294,130 which issued August 24, 1942 to Frank Porter. When the above substituted napthenes are oxidized in the presence of ammonia or a primary alkyl amine to form nitriles, however, the nature of the catalyst appears to be of less importance than in the oxidation of benzene or naphthalene to maleic anhydride or phthalic anhydride. Thus, catalysts which give but poor yields of the acid anhydrides from those aromatic compounds may be used effectively when the oxidation of alkyl cyclohexanes or cyclopentanes is carried out with ammonia or the amine present in accordance with my invention. I attribute this to the ammonia or amine reacting with intermediate oxidation products of the substituted naphthenes, particularly with alcohols, aldehydes, ketones or acid anhydrides, to form the corresponding nitriles and to these nitriles being exceptionally stable under the reaction conditions. Hence, the nitriles are formed and remain undecomposed under conditions which do not give good yields of less stable intermediate oxidation products which are formed in the previously known procedures of oxidizing aromatic compounds with molecular oxygen.

Among the numerous catalysts which may be employed in carrying out my process, I may mention thorium, molybdenum, vanadium, tin, chromium, tungsten, cobalt, iron, manganese or copper, employed as the metals or the metal oxides, the oxides of aluminum, uranium, etc., vanadates, vanadic acid and mixtures of these various catalysts with each other and with other materials, particularly catalysts containing both vanadium and molybdenum oxides. While the suitable temperatures will vary according to the particular catalysts being employed and other operating conditions, in general the reaction mixture containing the substituted naphthene, oxygen and ammonia or primary amine is contacted with the catalyst at temperatures ranging from about 350° to 600° C., preferably at about 400° to about 500° C.

My invention will be further illustrated by the following examples:

*Example 1.*—A mixture of ammonia, methyl cyclohexane vapors and air in the proportions of 2 mols ammonia, 1 mol methyl cyclohexane and 150 mols of air is preheated and passed in contact with a vanadium-molybdenum-phosphorus catalyst at 440° C. and at a space velocity of 2400. The catalyst is prepared by the procedure described for making "catalyst A (a maleic anhydride catalyst)" on page 2 of United States Patent 2,294,130 of August 24, 1942 to Frank Porter. In making the catalyst ammonium vanadate, molybdenum trioxide and phosphoric acid are used to form the active catalytic material and 8–10 mesh alundum as a carrier, in proportions such that the catalyst contains 11.4% vanadium, 3.9% molybdenum and 0.034% phosphorus (calculated as the oxides $V_2O_5$, $MoO_3$ and $P_2O_5$, respectively). Using this catalyst and with the foregoing reaction conditions, 66% of the methyl cyclohexane is attacked with a 44 mol percent yield of benzonitrile based on the methyl cyclohexane attacked.

*Example 2.*—Dimethyl cyclopentane vapors mixed with ammonia and air in the proportions of 2.0 mols of ammonia and 75 mols of air to every 1 mol of dimethyl cyclopentane is passed in contact with the catalyst of Example 1 at 475° C. and a space velocity of 2500. The principal product formed in thus treating dimethyl cyclopentane is benzonitrile.

I claim:

1. The process for the production of an aromatic nitrile which comprises contacting at temperatures in the range 350° to 600° C. with a catalyst for the vapor phase partial oxidation of benzene and naphthalene, respectively, to maleic and phthalic anhydride, a gaseous mixture containing oxygen, ammonia and an organic compound from the group consisting of the alkyl substituted cyclopentanes which contain at least 2 carbon atoms in the alkyl substituent and the alkyl substituted cyclohexanes, said gaseous mixture containing at least 1 mol ammonia for every 1 mol of said organic compound.

2. The process for the production of an aromatic nitrile which comprises contacting at temperatures in the range 350° to 600° C. with a catalyst for the vapor phase partial oxidation of benzene and naphthalene, respectively, to maleic and phthalic anhydride, a gaseous mixture containing oxygen, ammonia and an organic compound from the group consisting of the alkyl substituted cyclopentanes which contain at least 2 carbon atoms in the alkyl substituent and the alkyl substituted cyclohexanes, said gaseous mixture containing at least about 2 mols of ammonia for every CN radical in the nitrile to be formed from said organic compound plus 1 mol of ammonia for every carbon atom which is burned from said organic compound in forming the nitrile therefrom.

3. The process for the production of an aromatic nitrile which comprises contacting at temperatures in the range 350° to 600° C. with a catalyst for the vapor phase partial oxidation of benzene and naphthalene, respectively, to maleic and phthalic anhydride, a gaseous mixture containing air, ammonia and an organic compound from the group consisting of the alkyl substituted cyclopentanes which contain at least 2 carbon atoms in the alkyl substituent and the alkyl substituted cyclohexanes, said gaseous mixture containing 1.5 to 7 mols ammonia and 50 to 200 mols air for every 1 mol of said organic compound.

4. The process for the production of an aromatic nitrile which comprises contacting at temperatures in the range 350° to 600° C. with a catalyst for the vapor phase partial oxidation of benzene and naphthalene, respectively, to maleic and phthalic anhydride, a gaseous mixture containing oxygen, ammonia and an alkyl substituted cyclohexane, said gaseous mixture containing at least 1 mol ammonia for every 1 mol of said alkyl substituted cyclohexane.

5. The process for the production of benzonitrile which comprises contacting at temperatures in the range of 350° to 600° C. with a catalyst for the vapor phase partial oxidation of benzene and naphthalene, respectively, to maleic and phthalic anhydride, a gaseous mixture containing oxygen, ammonia and methyl cyclohexane, said gaseous mixture containing at least about 2 mols of ammonia for every 1 mol of methyl cyclohexane.

6. The process for the production of benzonitrile which comprises contacting with a catalyst for the vapor phase partial oxidation of benzene and naphthalene, respectively, to maleic and phthalic anhydride, a gaseous mixture containing air, ammonia and methyl cyclohexane, said gaseous mixture containing 1.5 to 7 mols ammonia and 50 to 200 mols air for every 1 mol of said alkyl substituted cyclohexane and being contacted with said catalyst at temperatures in the range of about 425° C. to about 475° C. at a space velocity of 1000 to 5000 cc. of reaction gas (calculated to S.T.P.) per hour per cubic centimeter apparent volume of catalyst.

7. The process for the production of benzonitrile which comprises contacting a gas-vapor reaction mixture containing molecular oxygen, ammonia and methyl cyclohexane with an oxidation catalyst containing the oxides of vanadium, molybdenum and phosphorus, said reaction mixture containing about 2 mols of ammonia for every 1 mol of methyl cyclohexane and being contacted with the said catalyst at temperatures within the range of about 400° C. to about 500° C.

MICHAEL ERCHAK, Jr.

REFERENCES CITED

The following references are of record in the file of this patent:

UNITED STATES PATENTS

| Number | Name | Date |
|---|---|---|
| 1,934,838 | Andrussow | Nov. 14, 1933 |
| 2,168,844 | Nelles | Aug. 8, 1939 |
| 2,177,619 | Nicodemus et al. | Oct. 24, 1939 |
| 2,203,861 | Deem et al. | June 11, 1940 |
| 2,299,755 | Jolly | Oct. 27, 1942 |
| 2,386,372 | Wagner | Oct. 9, 1945 |